UNITED STATES PATENT OFFICE.

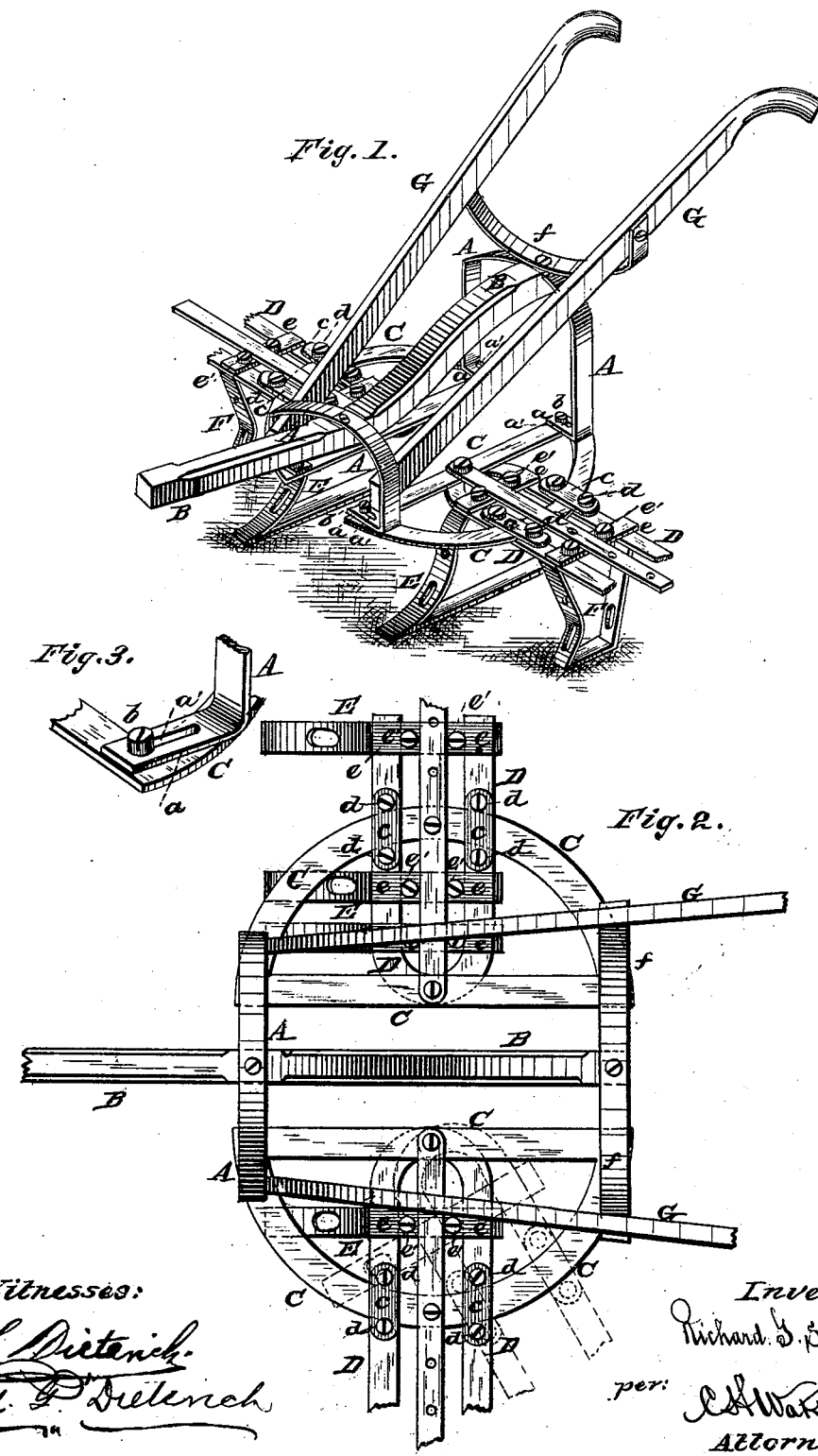

RICHARD G. S. AUSTIN, OF PINE BLUFF, ARKANSAS.

COTTON-CULTIVATOR.

SPECIFICATION forming part of Letters Patent No. 228,853, dated June 15, 1880.

Application filed May 4, 1880. (No model.)

*To all whom it may concern:*

Be it known that I, RICHARD G. S. AUSTIN, of Pine Bluff, in the county of Jefferson and State of Arkansas, have invented certain new and useful Improvements in Cotton-Cultivators; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention contemplates improvements in cotton-cultivators; and it consists in the construction and arrangement of parts, as will be hereinafter more fully set forth, and particularly pointed out in the claims.

In the annexed drawings, Figure 1 is a perspective view of my improved cotton-planter. Fig. 2 is a plan view, and Fig. 3 is a detail perspective view thereof.

A A indicate the tongue-arches, to the upper central portions of which the tongue B is fastened, with the lesser one capable of being replaced by one corresponding in size with the greater in case the height of the growing cotton or corn requires it.

C C indicate wings or arms, made semicircular in form, with slots in their corners or not, as desired, while the lower ends of the arches are provided with inwardly-projecting or right-angled portions $a\, a$, having slots $a'\, a'$, through which are inserted adjusting-screws $b$, entering the wings or arms C C at their corners. This permits of the adjustment of the wings C, having the plow-standards nearer together or farther apart, to correspondingly affect the plow-standards or plows to cause them to throw more or less dirt around the cotton or corn or loosen the ground a greater or less distance around the same.

D D are bars or frames, preferably of a horseshoe or U shape, with the center of their curved portions pivoted at or about the center of the straight portions of the wings C, to permit the said bars or frames to swing in the arc of a circle on a horizontal plane. The outer ends of the bars or frames D D are clipped to the wings by parallel short bars or plates $c\, c$, placed above said wings and having adjusting-screws $d\, d$. These bars or frames can be adjusted horizontally with the curvature of the wings C by loosening their outer ends, and by which it will be observed that the plow-standards attached to said bars or frames D, with their plows or shovels, can be adjusted so as to vary the angle of presentation of the plows to the row of cotton or corn.

E E are the plow-standards, having their upper ends connected adjustably to the inner ends of the bars or frames D by bolts or screws $e'\, e'$ passing through the plates $e\, e$ on the upper side of said bars or frames and entering the plow-standards. These standards have forward curved bars and rear bars, with horizontal connecting-bars, which rest and slide on the ground, supporting the cultivator in position. Both their forward and rear bars are provided with apertures for the attachment to said standards of plows either to the front or rear bars.

F F are additional similar standards, which may be of less size, and are similarly connected to the bars or frames D, either outside or inside of the wings C, and are also reversible.

G G are the handles, suitably bolted or fastened to the front or lesser arch and to an inverted arch, $f$, with its convex side fastened to the corresponding surface of the greater arch.

Having thus fully described my invention, what I claim as new, and desire to secure by Letters Patent, is—

1. In a straddle-row cultivator, the combination, with the two semicircular wings C and the tongue-arches A, of the pivoted arms or frames D, adapted to slide upon the curved bars of said wings and be held adjustably thereon by the plates $c$ and set-screws $d$, connecting the frames D to said wings, substantially as and for the purpose set forth.

2. In a straddle-row cultivator, the combination, with the tongue-arches A A, having inwardly-projecting portions $a$, of the semicircular wings C, carrying the pivoted standard arms or frames D, substantially as and for the purpose set forth.

In testimony that I claim the foregoing as my own I have hereto affixed my signature in presence of two witnesses.

RICHARD G. S. AUSTIN.

Witnesses:
 WM. B. UPPERMAN,
 M. A. AUSTIN.